(12) United States Patent
Lo et al.

(10) Patent No.: US 8,984,247 B1
(45) Date of Patent: Mar. 17, 2015

(54) STORING AND RECONSTRUCTING MAPPING TABLE DATA IN A DATA STORAGE SYSTEM

(75) Inventors: Jerry Lo, Hacienda Heights, CA (US); Frederick H. Adi, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 205 days.

(21) Appl. No.: 13/468,999

(22) Filed: May 10, 2012

(51) Int. Cl.
*G06F 12/00* (2006.01)

(52) U.S. Cl.
USPC .......................................................... 711/165

(58) Field of Classification Search
USPC .......................................................... 711/165
See application file for complete search history.

(56) References Cited

U.S. PATENT DOCUMENTS

| | | | |
|---|---|---|---|
| 5,835,955 A * | 11/1998 | Dornier et al. | 711/162 |
| 6,728,826 B2 * | 4/2004 | Kaki et al. | 711/103 |
| 6,856,556 B1 | 2/2005 | Hajeck | |
| 7,126,857 B2 | 10/2006 | Hajeck | |
| 7,212,440 B2 | 5/2007 | Gorobets | |
| 7,430,136 B2 | 9/2008 | Merry, Jr. et al. | |
| 7,447,807 B1 | 11/2008 | Merry et al. | |
| 7,502,256 B2 | 3/2009 | Merry, Jr. et al. | |
| 7,502,259 B2 | 3/2009 | Gorobets | |
| 7,509,441 B1 | 3/2009 | Merry et al. | |
| 7,596,643 B2 | 9/2009 | Merry, Jr. et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,374 B2 | 3/2010 | Diggs et al. | |
| 7,733,712 B1 | 6/2010 | Walston et al. | |
| 7,765,373 B1 | 7/2010 | Merry et al. | |
| 7,898,855 B2 | 3/2011 | Merry, Jr. et al. | |
| 7,912,991 B1 | 3/2011 | Merry et al. | |
| 7,913,061 B2 * | 3/2011 | Gorobets et al. | 711/220 |
| 7,936,603 B2 | 5/2011 | Merry, Jr. et al. | |
| 7,962,792 B2 | 6/2011 | Diggs et al. | |
| 8,078,918 B2 | 12/2011 | Diggs et al. | |
| 8,090,899 B1 | 1/2012 | Syu | |
| 8,095,851 B2 | 1/2012 | Diggs et al. | |
| 8,108,692 B1 | 1/2012 | Merry et al. | |
| 8,122,185 B2 | 2/2012 | Merry, Jr. et al. | |
| 8,127,048 B1 | 2/2012 | Merry et al. | |
| 8,135,903 B1 | 3/2012 | Kan | |
| 8,151,020 B2 | 4/2012 | Merry, Jr. et al. | |
| 8,161,227 B1 | 4/2012 | Diggs et al. | |
| 8,166,245 B2 | 4/2012 | Diggs et al. | |
| 8,194,340 B1 | 6/2012 | Boyle et al. | |
| 8,194,341 B1 | 6/2012 | Boyle et al. | |
| 8,243,525 B1 | 8/2012 | Kan | |
| 8,254,172 B1 | 8/2012 | Kan | |
| 8,261,012 B2 | 9/2012 | Kan | |
| 8,296,625 B2 | 10/2012 | Diggs et al. | |
| 8,312,207 B2 | 11/2012 | Merry, Jr. et al. | |
| 8,316,176 B1 | 11/2012 | Phan et al. | |
| 8,341,339 B1 | 12/2012 | Boyle et al. | |
| 8,375,151 B1 | 2/2013 | Kan | |

(Continued)

*Primary Examiner* — Charles Rones
*Assistant Examiner* — Nanci Wong

(57) ABSTRACT

A data storage subsystem is disclosed that implements a process for storing and/or reconstructing system data, such as a system mapping table. In certain embodiments, table pages and log pages are systematically copied, or flushed, to non-volatile memory in an interleaving manner according to a fixed ratio of log pages to table pages, thereby facilitating coherency of data. Full and/or partial reconstruction of a table may be performed within a bounded number of operations based on the size of the table, the ratio implemented, and/or other characteristics.

15 Claims, 11 Drawing Sheets

200

| $T_0$ | $T_1$ | $L_0$ | $L_1$ | $L_2$ | $T_2$ | $T_3$ | $L_3$ | $L_4$ | $L_5$ | $T_0$ | $T_1$ | $L_6$ | $L_7$ | $L_8$ | $T_2$ | $T_3$ | $L_9$ | $L_{10}$ | $L_{11}$ | $T_0$ | $T_1$ | $L_{12}$ |
|---|---|---|---|---|---|---|---|---|---|---|---|---|---|---|---|---|---|---|---|---|---|---|

(56) References Cited

U.S. PATENT DOCUMENTS

| | | |
|---|---|---|
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,745,277 B2 | 6/2014 | Kan |
| 8,793,429 B1 | 7/2014 | Call et al. |
| 2002/0184436 A1* | 12/2002 | Kim et al. ............... 711/103 |
| 2003/0065899 A1 | 4/2003 | Gorobets |
| 2004/0083405 A1* | 4/2004 | Chang et al. ............ 714/24 |
| 2004/0210706 A1 | 10/2004 | In et al. |
| 2005/0166028 A1* | 7/2005 | Chung et al. ............ 711/170 |
| 2008/0098195 A1 | 4/2008 | Cheon et al. |
| 2009/0150599 A1* | 6/2009 | Bennett .................. 711/103 |
| 2010/0082919 A1* | 4/2010 | Chen et al. ............. 711/161 |
| 2010/0106897 A1* | 4/2010 | Yoshimura ............. 711/103 |
| 2010/0174849 A1 | 7/2010 | Walston et al. |
| 2010/0180068 A1* | 7/2010 | Matsumoto et al. .... 711/103 |
| 2010/0250793 A1 | 9/2010 | Syu |
| 2011/0099323 A1 | 4/2011 | Syu |
| 2011/0161621 A1 | 6/2011 | Sinclair et al. |
| 2011/0283049 A1 | 11/2011 | Kang et al. |
| 2011/0307651 A1 | 12/2011 | Wong |
| 2012/0110247 A1* | 5/2012 | Eleftheriou et al. .... 711/103 |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0166819 A1* | 6/2013 | Yerushalmi et al. .... 711/103 |
| 2013/0185508 A1* | 7/2013 | Talagala et al. ........ 711/118 |
| 2013/0290793 A1 | 10/2013 | Booth et al. |
| 2014/0059405 A1 | 2/2014 | Syu et al. |
| 2014/0115427 A1 | 4/2014 | Lu |
| 2014/0133220 A1 | 5/2014 | Danilak et al. |
| 2014/0136753 A1 | 5/2014 | Tomlin et al. |

\* cited by examiner

STORING AND RECONSTRUCTING MAPPING TABLE DATA IN A DATA STORAGE SYSTEM

BACKGROUND

1. Technical Field

This disclosure relates to non-volatile storage subsystems. More particularly, the disclosure relates to systems and methods for storing and loading system table data.

2. Description of the Related Art

Non-volatile storage systems can include system tables, such as logical-to-physical mapping table data. Such data may associate logical addresses used by a host system with corresponding physical storage locations in the non-volatile storage system. In certain circumstances, it may be desirable for system table data to be loaded from non-volatile memory, along with log data that indicates changes to a system table. However, loading and updating system table data can incur delays for memory accesses.

BRIEF DESCRIPTION OF THE DRAWINGS

Systems and methods that embody the various features of the invention will now be described with reference to the following drawings, in which:

FIGS. 4A-4C illustrate embodiments of portions of a non-volatile memory array.

FIGS. 8A-8C illustrate embodiments of portions of a non-volatile memory array.

DETAILED DESCRIPTION OF SPECIFIC EMBODIMENTS

Figure 1:
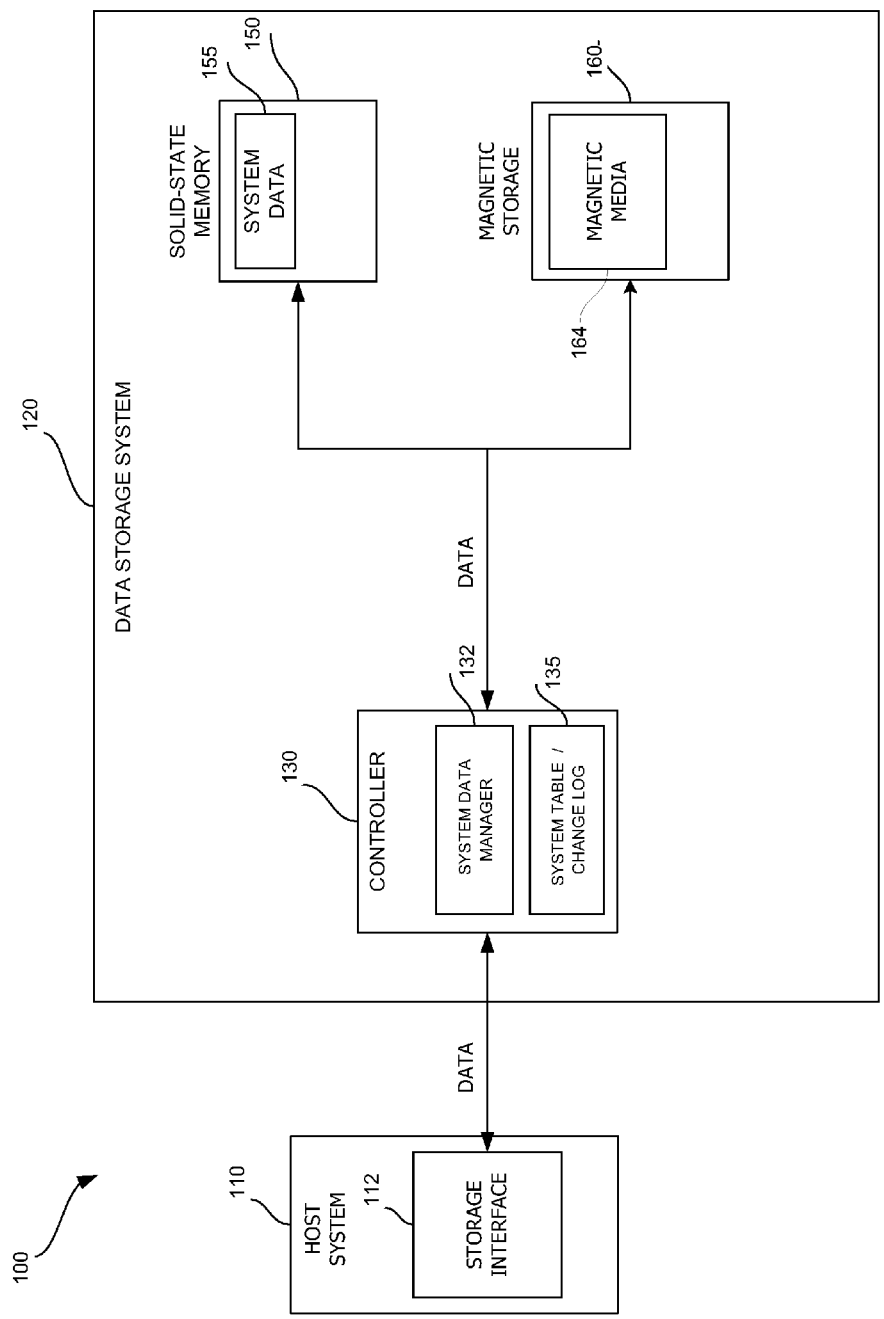
FIG. 1 illustrates an embodiment of a storage system that implements system data storage in accordance with one or more embodiments of the invention.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

DEFINITIONS

As used in this application, "non-volatile memory" may refer to solid-state memory such as NAND flash. However, the systems and methods of this disclosure may also be useful in more conventional hard drives and hybrid drives including both solid-state and hard drive components. Solid-state memory may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The solid-state storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

As used herein, a "segment" refers broadly to any partition, division, or portion of a whole. Segments may or may not be of equal size and the size of each segment may vary over time. The term "page" is used herein according to its broad and ordinary meaning, and may include, among other things, a portion or segment of a storage array or storage device. Although certain embodiments may be described in the context of "pages," embodiments of systems and methods disclosed herein may be implemented with respect to pages or segments. Therefore, reference to the copying or reading of a page should be understood to also potentially apply to the copying or reading of a segment of pages.

Overview

Data storage systems may include system tables having various sizes and/or characteristics. With respect to system tables of certain sizes, it may be desirable to store table data and related log data in separate structures. Such systems may take advantage of characteristics of certain non-volatile storage systems that allow for parallel storage of multiple table and/or log pages. However, storage of certain data in separate structures may make coherency of data a concern for purposes of reconstruction of table data. Furthermore, loading partial segments of system table data may require to some extent, or be facilitated by, data coherency.

Certain data storage systems implement serial copying, or "flushing" of system table and/or log data to non-volatile storage. Data coherency may be relatively easier to attain in such systems, though other considerations, such as load time, may make serial system table and log storage undesirable. In addition, the ability to load partial segments of table data efficiently may still be a concern.

In some embodiments of the present invention, system data and/or associated logs are stored in an interleaving manner. In certain embodiments, such a system may allow for satisfactory loading of partial segments of table data while maintaining satisfactory levels of data coherency. The various embodiments described in this disclosure increase the efficiency of table data reconstruction (e.g., mapping data, invalid table data, etc.) at power-up, the performance of which is often critical in applications such as solid-state storage devices.

System Overview

In non-volatile storage devices, such as solid-state storage devices, commands can be received from a host designating a logical memory address. The logical memory address can then be converted into a physical address corresponding to a storage location on the non-volatile media. This logical-to-physical address mapping may be maintained in a mapping table in volatile memory of a controller of the storage device. As changes are made to the mapping table, the controller may periodically save a copy of the mapping table, or pages of the mapping table, to the non-volatile storage array. Because the mapping table can comprise a significant amount of data (e.g.

256 Mb for a 256 Gb drive), changes to the mapping table made between saves to the non-volatile storage array can be recorded in a log of mapping table changes and the log can also be saved to non-volatile memory. In this way, the storage device is able to reload the mapping table to volatile memory from the non-volatile memory and reconstruct any changes to the mapping table by using the log data. On system power up, table data may be loaded prior to servicing any media access requests to ensure the logical addresses resolve to the proper locations on the storage array.

FIG. 1 illustrates a storage system 100 that implements system data storage in accordance with one or more embodiments of the invention. As shown, a storage system 120 includes a number of components. In a solid-state drive embodiment, the storage system 120 includes a controller 130, non-volatile storage module 150, such as a solid-state memory device, which comprises system data 155. In a disk drive or hybrid disk drive embodiment, the storage system 120 additionally includes a magnetic storage module 160, which comprises magnetic media 164 (e.g., a magnetic disk). The non-volatile storage module 150 can comprise one or more non-volatile solid-state memory arrays.

The controller 130 can be configured to receive data and/or storage access commands from a storage interface module 112 (e.g., a device driver) in a host system 110. Storage access commands communicated by the storage interface 112 can include write and read commands issued by the host system 110. Read and write commands can specify a logical block address in the storage system 120. The controller 130 can execute the received commands in the non-volatile storage module 150 or in the magnetic storage module 160. In one embodiment, the controller can include memory (e.g., DRAM) for storing data, such as system tables. In certain embodiments, one or more of the depicted devices or modules may be omitted, such as, for example, magnetic storage 160.

The non-volatile storage module 150 may be implemented using NAND flash memory devices. Other types of solid-state memory devices can alternatively be used. In one embodiment, the memory devices are MLC devices, SLC memory devices, or a combination of SLC and MLC devices, may be used in some embodiments.

Storage system 120 can store data communicated by the host system 110. That is, the storage system 120 can act as memory storage for the host system 110. To facilitate this function, the controller 130 can implement a logical interface that can present to the host system 110 storage system's 120 memory as a set of logical addresses (e.g., contiguous address) where data can be stored. Internally, the controller 130 can map logical addresses to various physical memory addresses in the magnetic media 164 and/or the non-volatile storage module 150.

In one embodiment, at least a portion of the non-volatile storage module 150 can be used as cache. The controller 130 can store data communicated by the host system 110 in the non-volatile storage module 150. To improve performance of the storage system 120 and/or host system 110, in some embodiments, various types of data can be stored in non-volatile memory cache, including frequently accessed data, data accessed at start-up (e.g., following a reset or power down), system data, sequentially accessed data, etc.

With continued reference to FIG. 1, the storage system 120 is in communication with the host 110 through storage interface 112. The interface 112 provides a communications pathway between the host device 110 and the storage system 120, and can implement any method of communication as known in the art, such as SATA, SAS, USB, Firewire and other communication methods. The controller 130 may be responsible for receiving and processing commands from the host 110 as well as internal commands. Functions of the controller 130 can be implemented in hardware and/or software on a processor and can be located in one or a plurality of physical components according to the designer's preference. In one embodiment, the controller 130 includes a volatile memory unit such as DRAM that stores one or more system tables and/or table change logs 135. In certain embodiments, system table and/or log data 135, or system data 155, can be separated into a plurality of segments. Each segment corresponds to a portion of the logical or physical addresses used in the system table. A table change log can record changes to the system table and separately record changes to each segment. The controller 130 may also include an invalid page table and associated logs, or other system data.

The controller depicted in FIG. 1 includes a system data manager module 132, which may manage the storing and/or loading of system data. Data maintained in volatile memory may be lost during a power failure event. Therefore, it may be desirable for the controller 130 to copy (or "flush") certain information to non-volatile storage, such as the non-volatile storage module 150. In certain embodiments, system data may be stored as segments on the non-volatile storage module device 150. The segments stored on the non-volatile storage module device 150 may be stored together or in different portions of the device.

Table Storage Structure

Certain embodiments disclosed herein provide for chronological and/or synchronized methods of writing system table and log pages to non-volatile memory.

Figure 2:
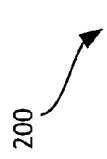
FIG. 2 illustrates an embodiment of a portion of a non-volatile memory array.

FIG. 2 illustrates a portion 200 of a non-volatile memory array. For example, memory array portion 200 may be stored on the non-volatile storage module device 150 of the system 100 shown in FIG. 1. Array portion 200 may be saved within a block of data within a non-volatile storage module, such as within a super block. Array portion 200 contains copies of table pages (e.g., $T_0$), as well as log pages (e.g., $L_0$) stored in an interleaving fashion. For example, log pages and table pages may be stored chronologically according to a fixed ratio of table pages to log pages. In the example shown, the contents of the entire table are split into the four pages $T_0$ to $T_3$, with each page covering a portion of the table. For example, when a table page such as $T_0$ is written to the memory array 200, the page records the most current contents in the portion the table that is covered by $T_0$. In certain embodiments, the table may contain logical-to-physical address mapping data, invalid location data, or any metadata/system data the data storage system may require as part of its typical operation. The subscript numbers associated with the various log pages indicate the chronological order in which such logs are copied to the memory array 200. As shown in FIG. 2, for every three log pages stored (e.g., $L_0$, $L_1$, $L_2$), two table pages are stored (e.g., $T_2$, $T_3$). Therefore, the illustrated embodiment conforms to a log page to table page ratio of 3 to 2. It should be understood, however, that any suitable ratio of log pages to table pages may be used, depending possibly on system requirements. In certain embodiments, table pages are stored in order based on relative physical location within the system table in volatile storage. For example, flushing may begin with the first page of the table, or another page, and continue in sequence. When the last page of the table is reached, in certain embodiments, the flushing process may cycle back to the first page of the table. In certain embodiments, table pages may be flushed in order from last to first.

In certain embodiments, log pages are flushed from volatile memory to non-volatile memory as changes to system table data are made or become necessary or desirable. After a predetermined number of log pages have been flushed to NVM (which may be include the non-volatile storage module 150 or the magnetic storage module 160 (e.g., in a shingled disk system where address indirection is used)), a system controller (e.g., system data manager 132) may be configured to flush one or more table pages to NVM prior to flushing further log pages. As will be described below with reference to subsequent figures, such a system data storage method may allow for improved synchronization of table and log pages for purposes of reconstruction of system table data. For example, storing table and log pages according to a fixed ratio may provide information relating to which of a group of previously flushed log pages has become obsolete, and therefore need not be loaded during reconstruction. Moreover, reconstruction time can thus be bounded and the storage system can power-up much more quickly.

As shown in the example embodiment of FIG. 2, groups of two table pages and three log pages are stored chronologically in an interleaving fashion. It should be noted that FIG. 2 depicts a logical storage of the pages. Therefore, while FIG. 2 depicts table and log pages stored in a serial fashion in a single block of storage(which may correspond to the physical storage arrangement), in certain embodiments, table pages and log pages may be physically stored in separate regions of a storage device, or in separate storage devices.

Figure 3:
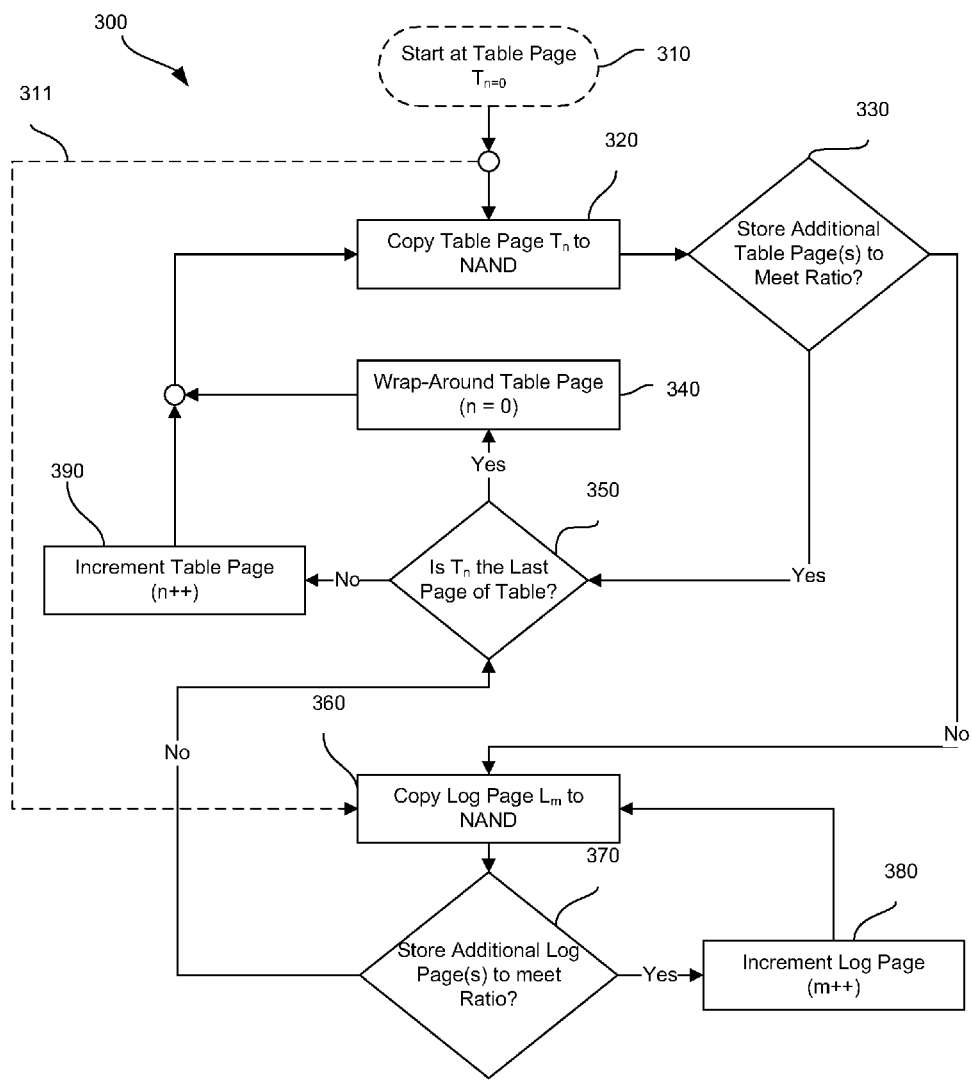
FIG. 3 illustrates a flow chart for an embodiment of a method of copying system table and log data from volatile storage to non-volatile memory.

FIG. 3 illustrates a flow chart for a method 300 of copying (i.e., flushing) system table and log data from volatile storage to NVM according to one embodiment. The method may be performed by the controller 130 (e.g., with system data manager 132). The method 300 starts at block 310 with table page $T_{n=0}$. At block 320, table page $T_n$ is copied to a solid-state storage device (e.g., NAND). At decision block 330, it is determined whether additional table pages are to be stored in order to meet a predetermined ratio of table pages to log pages. If additional table pages are required, it is determined at 350 whether $T_n$ is the last page of the table. If the last table page (or first, depending on the implementation method) has been reached, $T_n$ is reset at block 340, and the method 300 progresses back to block 320. If $T_n$ is not the last page of the table, n is incremented prior to progressing back to copy an additional table page at block 320.

When an adequate number of table pages have been stored to conform with the predetermined ratio of table pages to log pages, the method 300 progresses to block 360, where a log page $L_m$ is copied to NVM. At block 370, it is determined whether to store additional log pages to meet the predetermined ratio of table pages to log pages. If more log pages are necessary or desired, m is incremented and the method 300 progresses back to block 360. The variable $L_m$ may represent the next log page chronologically stored in volatile memory that is to be updated. Once enough log pages have been copied, the method 300 progresses back to block 350, from where the method is directed to copy one or more table pages. The method 300 may be performed indefinitely, or for a set amount of time, or set number of operations, such as write commands.

Although in FIG. 3 the copying of table pages is illustrated towards the top of the figure and the copying of log pages is illustrated towards the bottom of the figure, it should be understood that the order in which table pages and log pages, or sets of table pages and sets of log pages, are copied can vary according to any desirable configuration. For example, as shown by dashed line 311, from the start block 310, the method 300 may progress directly to block 360, where one or more log pages are copied to NVM.

Full Reconstruction

Figures 4A, 4B, 4C:
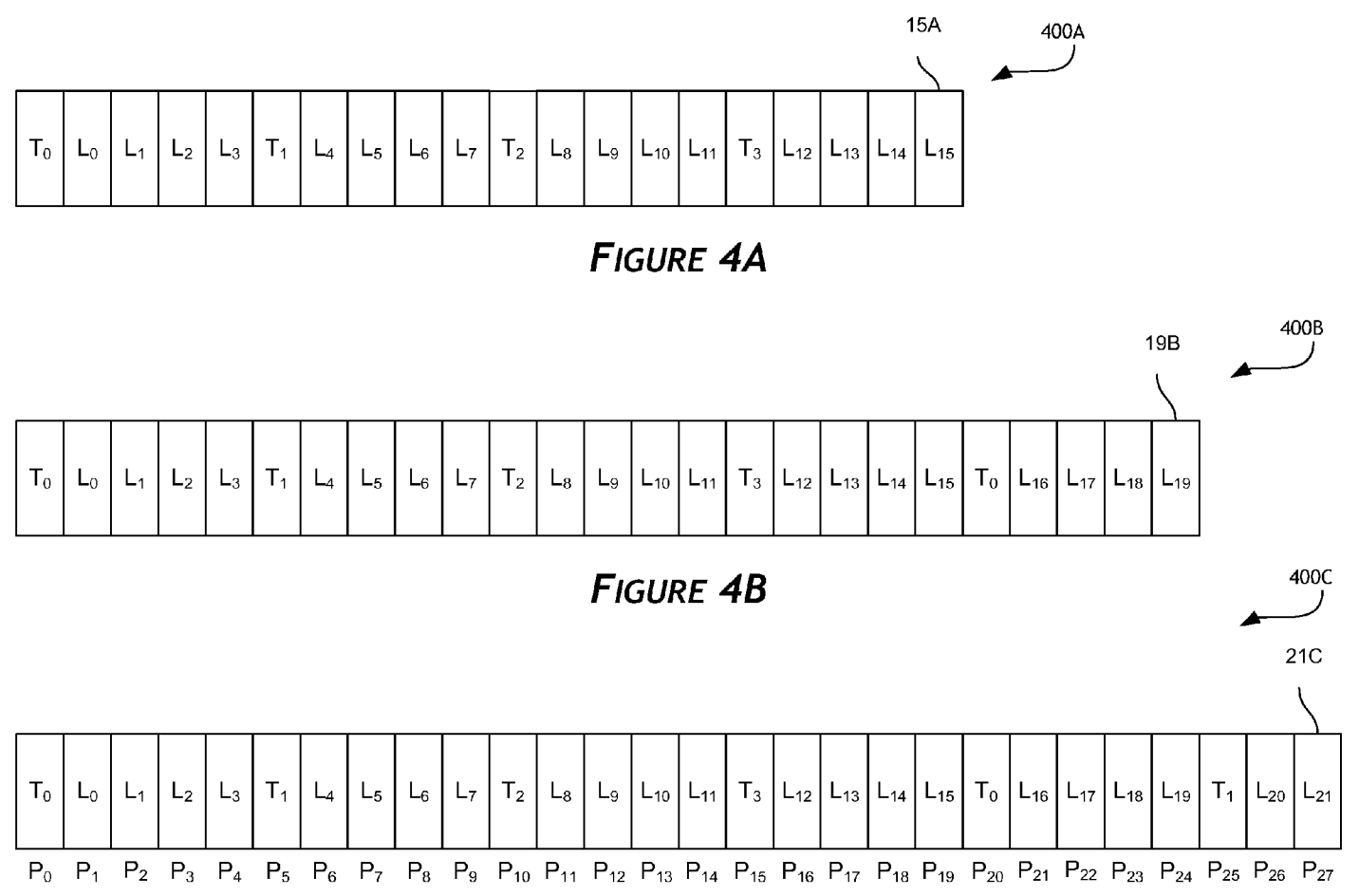
Figure 5A:
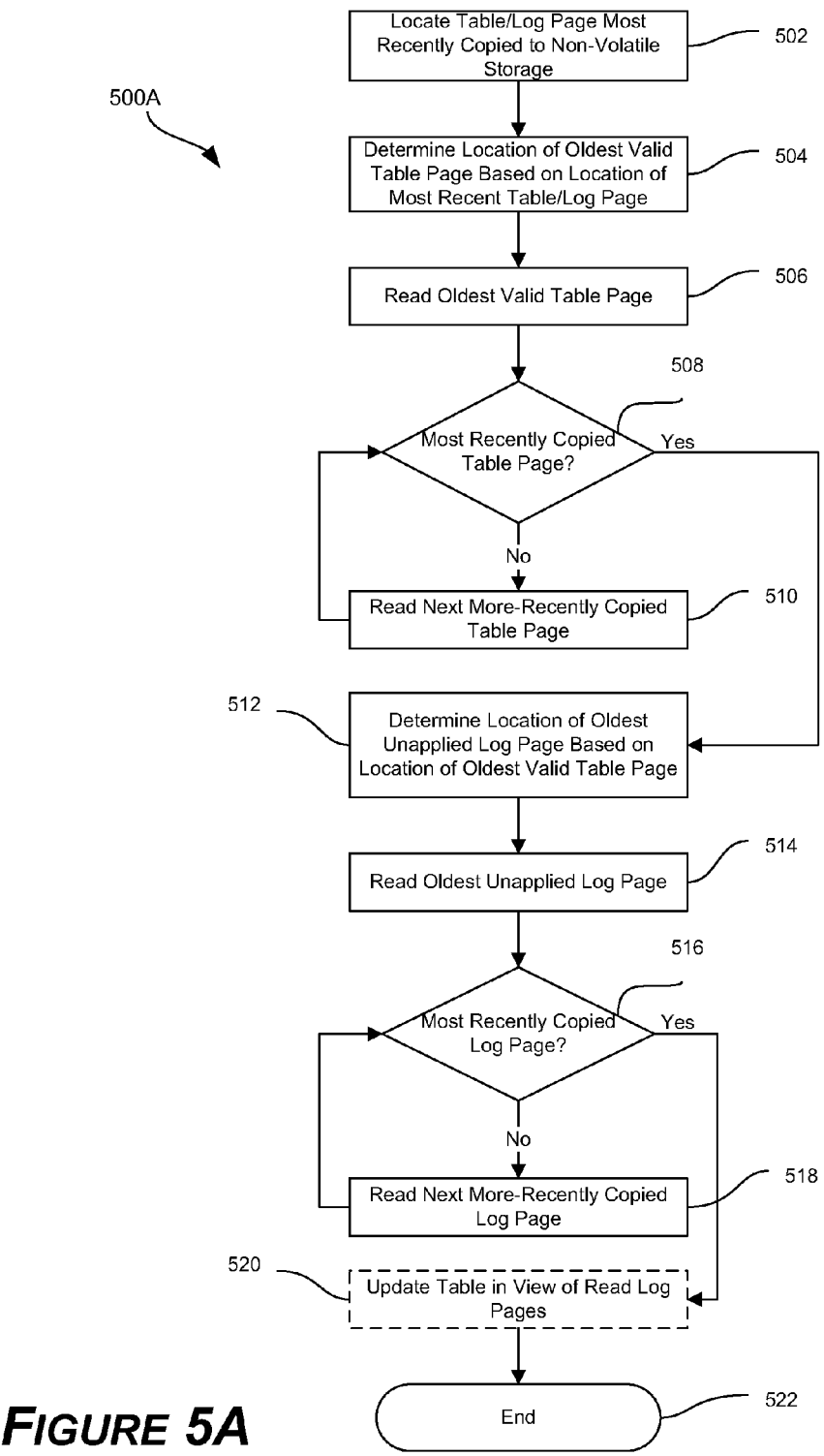
FIGS. 5A and 5B depict embodiments of methods of reconstructing a system table from non-volatile to volatile memory.

FIGS. 4A-4C illustrate portions 400A-400C of a non-volatile memory array according to one embodiment. The portions depicted show system data storage according to one or more embodiments disclosed herein, and may be helpful in reference to the methods disclosed in FIGS. 5A and 5B, which depict embodiments of methods of reconstructing a system table from NVM to volatile memory. With reference to FIG. 5A, a method 500A includes locating, in NVM, a table or log page most recently copied to NVM. For example, as shown in FIGS. 4A-4C, which may represent chronological storage of table an log pages moving from left to right, $L_{15}$ (15A), $L_{19}$ (19B), and $L_{21}$ (21C), respectively, may represent most recently copied pages.

It may be possible to calculate a location of an oldest valid table page based on the location of the most recently copied table/log page. This is performed at block 504. For example, it may be possible to make such a calculation based on information related to a ratio (R) of table pages to log pages to which the memory array portions 400A-400C conform. As illustrated in the figures, portions 400A-400C conform to a table page to log page ratio of one to four. That is, for every four log pages stored, one table page is stored. However, any suitable ratio may be implemented in accordance with embodiments disclosed herein, such as, for example, one to sixteen, or one to thirty-two. Based on a ratio of one to four, portions 400A-400C can be viewed as five-page segments, each including a table page and four log pages.

Information related to the size of the particular system table may also contribute to calculating the oldest valid table page. For example, the embodiments shown in FIGS. 4A-4C relate to system tables having a size ($T_{cnt}$) of four pages (i.e., $T_0$-$T_3$). With reference to the storage configuration of FIG. 4C, it can be seen that the most recently copied page 21C is the $28^{th}$ ($P_{tot}$) page (i.e., $P_{27}$) written starting with page table page $T_0$ written at page $P_0$, including 6 table pages and 22 log pages. For the embodiment 400C depicted in FIG. 4C, the following equation may be used to calculate the oldest valid table page (P):

$$P = P_{current} - ((T_{cnt}-1) \times \text{SegSize} + (P_{tot} \% \text{SegSize}));$$

wherein $P_{current}$ is the location of the current pointer for data storage (e.g., the pointer may currently be pointing at $P_{28}$, the page subsequent to the last written page; SegSize is the number of table pages saved per iteration plus the number of log pages saved per iteration, according to the predetermined ratio (e.g., 1 table page+4 log pages=5 pages per segment); % represents a modulo operator. Therefore:

$$P = 28 - ((4-1) \times 5 + 28\%5) = 28 - (15+3) = 10$$

Therefore, in the embodiment of FIG. 4C, the oldest valid table page is at location $P_{10}$, where the table page $T_2$ is stored. Various other methods for determining the location of the oldest valid table page may also exist.

The oldest valid table page is read at block 506. At block 508, it is determined whether the table page read is the most recently copied table page. This is performed at decision block 508. If there are one or more subsequently copied table pages to read, they are read in decision loop 508, 510. Once the most recently copied table page has been read, the oldest unapplied log page is located based at least in part on either the location of the oldest valid table page or the most recent table/log page at block 514. Log pages and table pages may be read from, or stored in, different sections of a memory device, or in different devices. In certain embodiments, log pages are applied to the system table in volatile memory as they are read. The loop represented by steps 516 and 518 involves reading subsequently copied log pages until the most recently copied log page is reached. The method 500A further includes updating the system table by applying the read log pages to the table. As described above, this may be done as the pages are read, or may be done at any other suitable time.

Once the log pages have been applied to the table, the table has been reconstructed in its entirety. As demonstrated by the example embodiments contained in FIGS. 4A-4C, as well as the equations and description above, the maximum number of pages required to load for full reconstruction of the table (MaxPagesToLoad) may be governed by the following equation:

$$\text{MaxPagesToLoad} = T_{cnt} \times (R+1)$$

Therefore, in the embodiments of FIGS. 4A-4C, MaxPagesToLoad is bounded by 20. That is, the number of pages required for full reconstruction would be 20 pages or less. Therefore, embodiments disclosed herein may provide for efficient system table reconstruction by allowing for obsolete pages (e.g., pages copied to NVM prior to the oldest valid table page) to be disregarded. Furthermore, embodiments disclosed herein may provide information relating to the time and or resources required to reconstruct table data. The deterministic nature of the maximum pages to load as a function of the chosen parameters provides predictability and certainty to system designers who may need to design a system to meet certain power-up performance (e.g., ensuring that the storage system post ready within a certain time frame). This solves a problem in prior solutions where the power-up time depended on an unknown variable since the system may not know what amount of updates to a table has been accumulated before the last power-off (i.e., how many pages would need to be loaded to reconstruct a table).

Figure 5B:
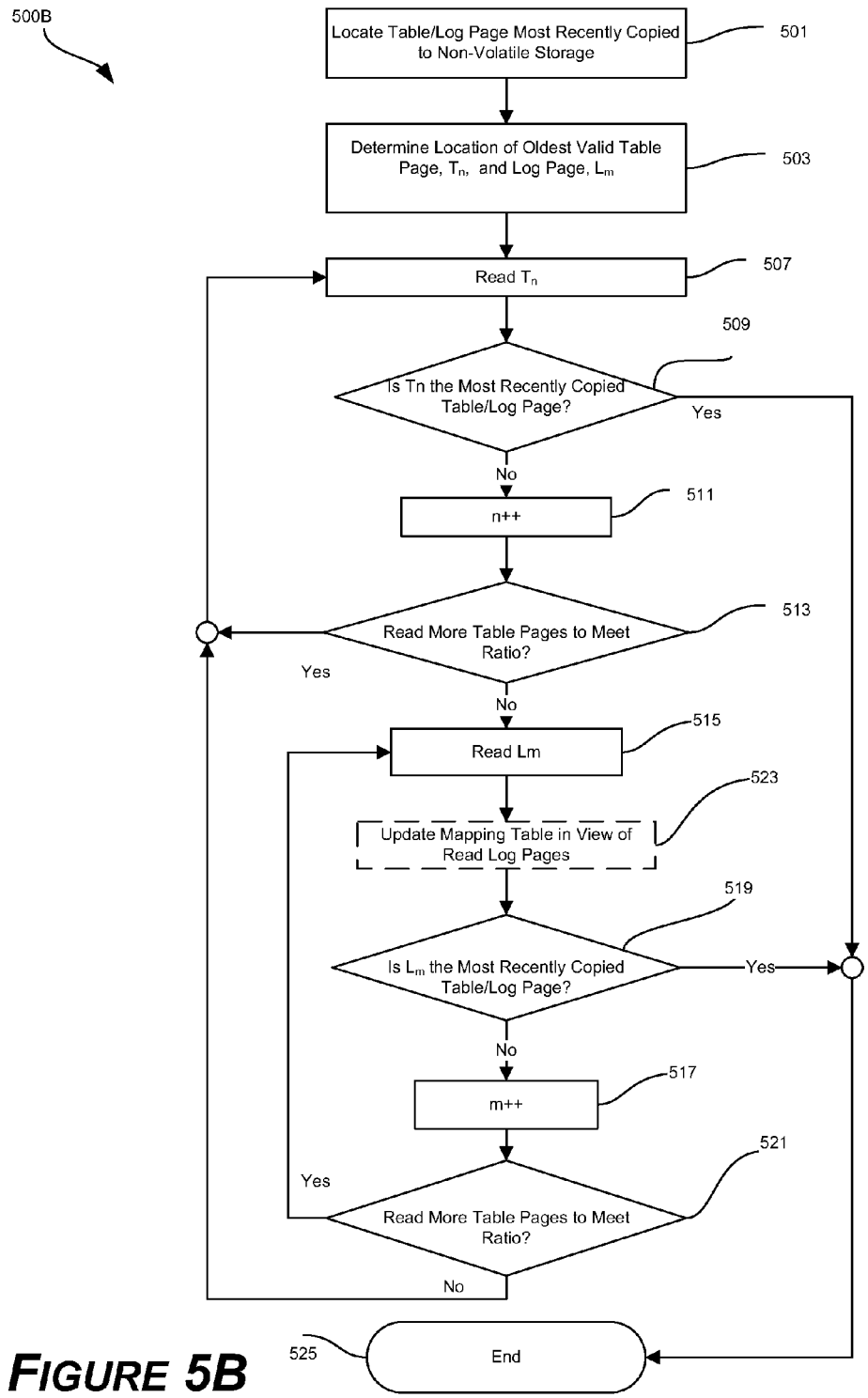

With reference to FIG. 5B, a method 500B includes locating, in NVM, a most recently copied table/log page at block 501. The method 500B includes determining the location of the oldest valid table page, $T_n$, and the oldest valid log page, $L_m$, at block 503. Such pages can be located based, at least in part, for example, on a ratio (R) of table pages to log pages, on a location of the most recently copied table/log page, and/or other information. The method further includes reading $T_n$ from NVM at block 507 and determining whether $T_n$ is the most recently copied table/log page at decision block 509. If $T_n$ is not the most recently copied table/log page, n is incremented at block 511 and it is determined whether to read more table pages in order to meet the table page to log page ratio R. If so, the method 500B loops between steps 513 and 507 until either $T_n$ is the most recently copied table/log page, or no more table pages are required to meet the ratio R. If $T_n$ is the most recently copied table/log page, the process is terminated. When the ration has been met at block 513, $L_m$ is read from NVM at block 515 and applied to the system table (e.g., mapping table) at block 505.

At block 519, it is determined whether $L_m$ is the most recently copied table/log page. If so, the process is terminated. If not, m is incremented and it is determined whether to read more log pages in order to meet the table page to log page ratio R. If so, the method 500B loops between steps 521 and 515 until either $L_m$ is the most recently copied table/log page, or no more log pages are required to meet the ratio R. If it is determined at block 521 that no more log pages are required to meet the ration R, then the process is directed back to block 507 where the next table page is read.

Partial Reconstruction

Figure 6:
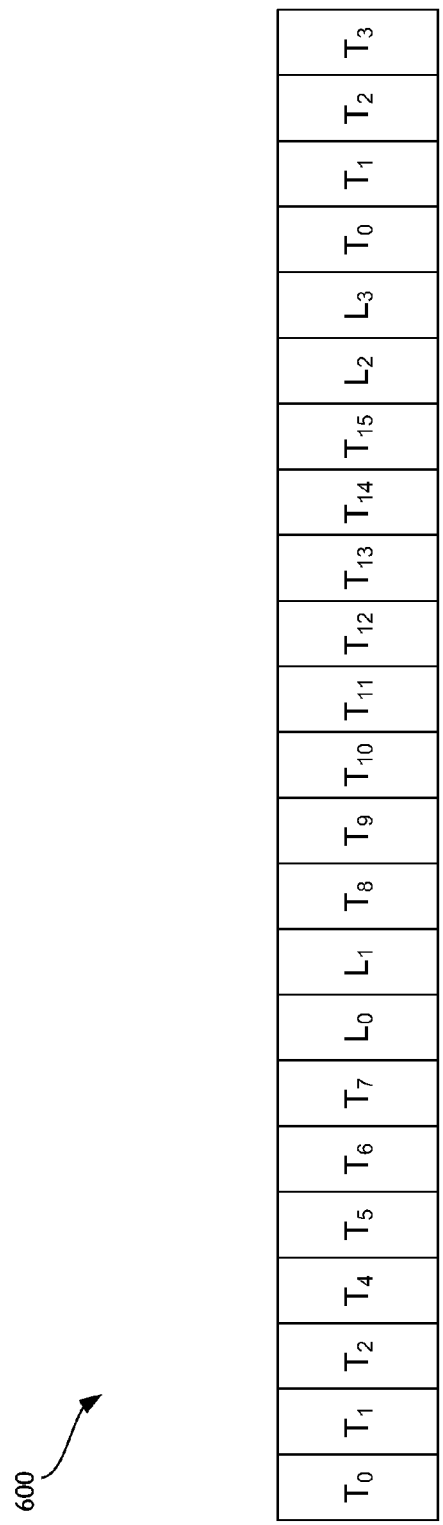
FIG. 6 illustrates an embodiment of a portion of a non-volatile memory array.
Figure 7:
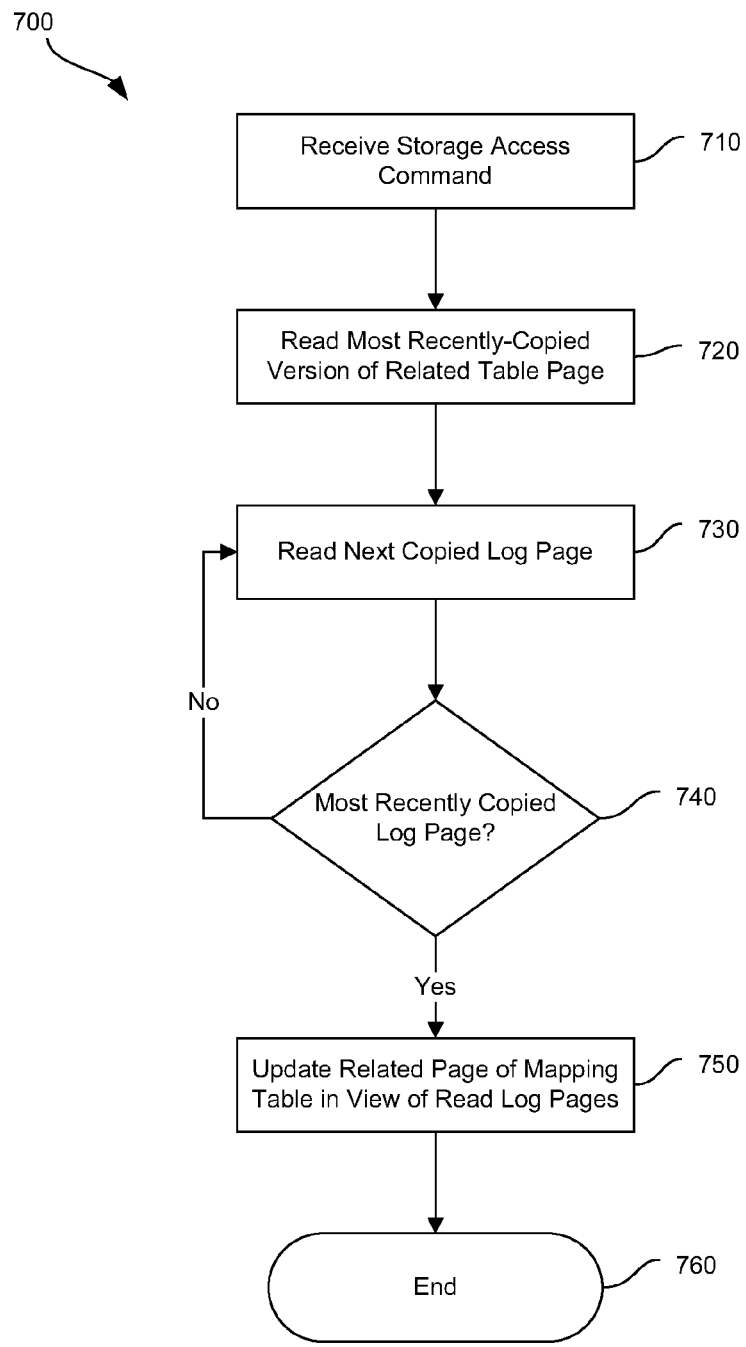
FIG. 7 depicts an embodiment of a method of partially reconstructing a system table from non-volatile to volatile memory.

FIG. 6 illustrates a portion 600 of a non-volatile memory array according to one embodiment. The portion depicted shows system data storage according to one or more embodiments disclosed herein, and may be helpful in reference to the method disclosed in FIG. 7, which depicts an embodiment of a method of partially reconstructing a system table from NVM to volatile memory. With reference to FIG. 7, a method 700 includes receiving a storage access command from a host system at block 710. The method 700 may be performed by the controller 130 (e.g., with system data manager 132). The storage access command relates to at least one table page stored in NVM. At block 720, a most recently recorded version of the related table page is read from NVM. Steps 730 and 740 comprise a loop which comprises reading subsequently copied log pages until the most recently copied log page is read. The method further includes updating the related page of a mapping table in view of the read log pages. Such a method may allow for reconstruction of one or more particular table pages, without having to fully reconstruct the mapping table. This may improve efficiency of a data storage system in certain embodiments or situations.

As an example, with reference to FIG. 6, if a data storage system receives a storage access command that requires access to a particular table page (e.g., $T_7$), as opposed to the entire table, it may only be desirable or necessary to read a limited number of pages in order to adequately reconstruct the particular page. For example, in order to reconstruct table page $T_7$, according to the storage structure depicted in FIG. 6, it may only be necessary to read $T_7$, and any subsequently recorded log pages (i.e., $L_0$, $L_1$, $L_2$ and $L_4$). Therefore, whereas full reconstruction of the table may have required up to twenty read operations (see description above with respect to FIGS. 4A-4C and FIGS. 5A-5B, partial reconstruction of a single table page in the embodiment of FIG. 6 may only require between one and five read operations (e.g., reconstruction of $T_0$, $T_1$, $T_2$ or $T_3$ would only require one read operation because there are no subsequently copied log pages.

Full Reconstruction with Partial Reconstruction on Demand

Figures 8A, 8B, 8C:
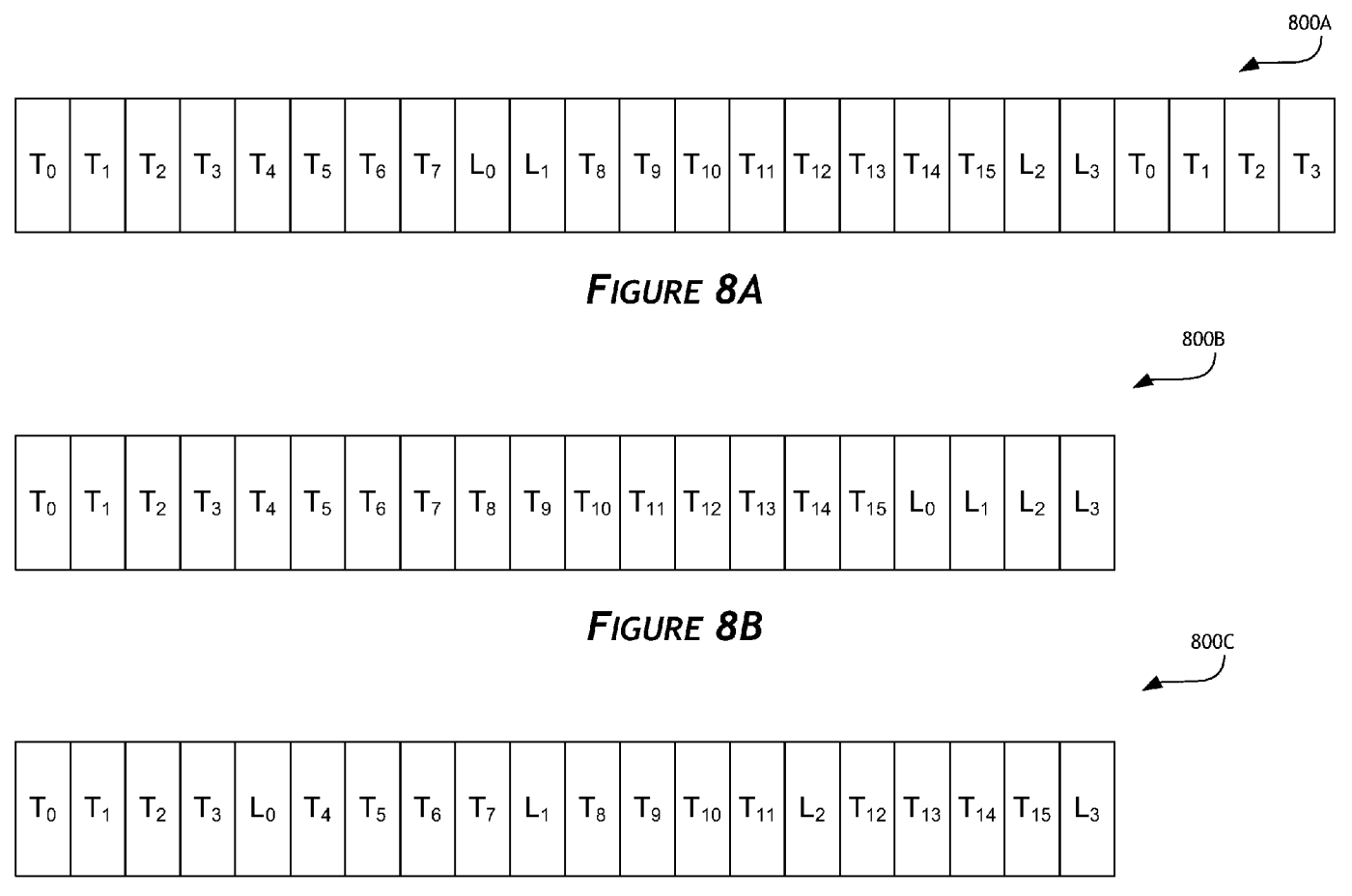
Figure 9:
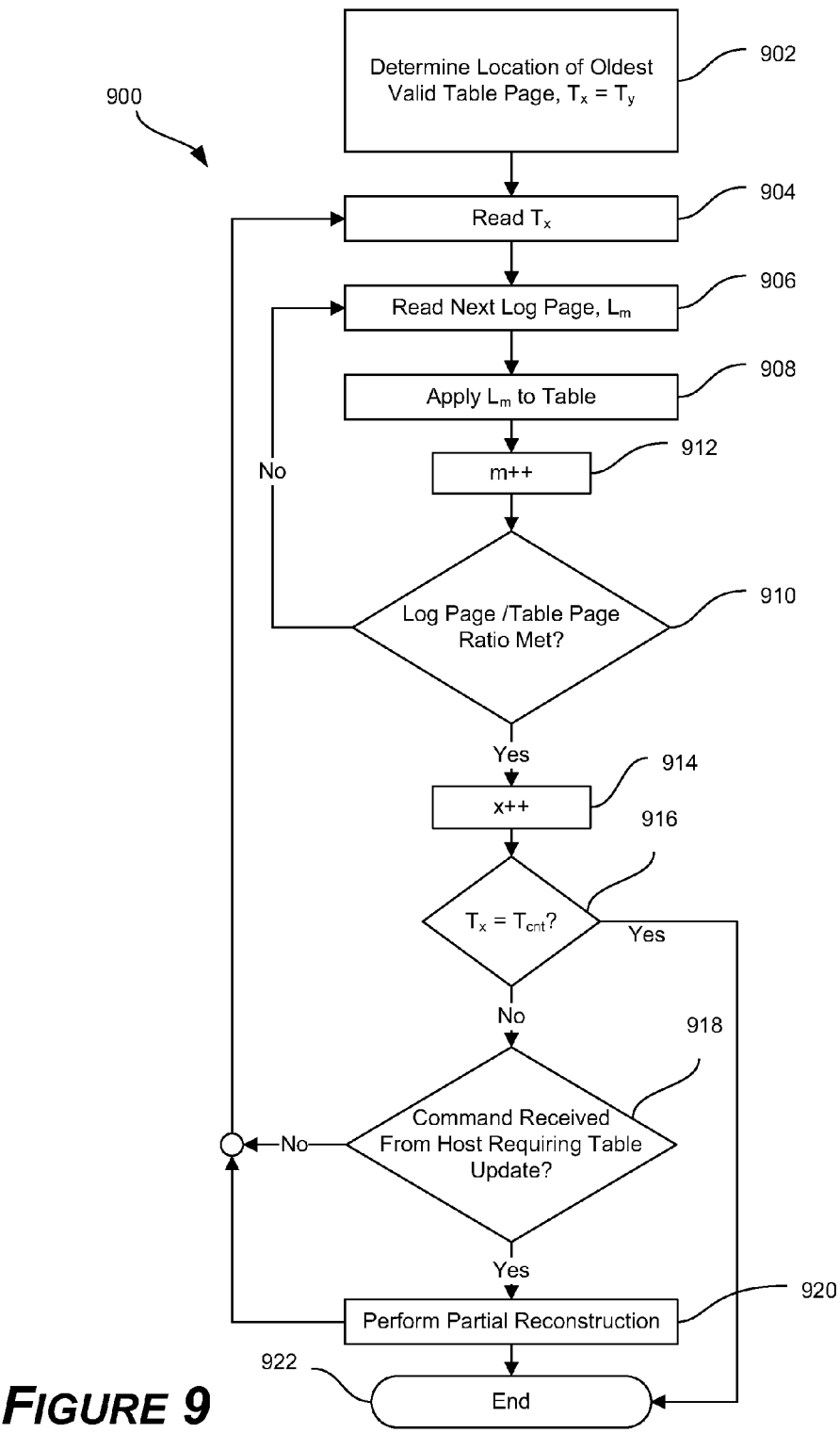
FIG. 9 depicts an embodiment of a method of reconstructing a system table from non-volatile to volatile memory.

FIGS. 8A-8C illustrate portions 800A-800C of a non-volatile memory array according to one embodiment. The portions depicted show system data storage according to one or more embodiments disclosed herein, and may be helpful in reference to the method disclosed in FIG. 9, which depicts an embodiment of a method of reconstructing a system table from NVM to volatile memory. With reference to FIG. 9, a method 900 includes determining the location of the oldest valid table page, $T_x$, wherein x initially is equal to a variable y. Such page can be located based, at least in part, for example, on a ratio (R) of table pages to log pages, on a location of the most recently copied table/log page, and/or other information. The method may be performed by the controller 130 (e.g., with system data manager 132). The method further includes reading $T_x$ from NVM at block 904 and the next subsequently copied log page, $L_m$, and applying $L_m$ to the system table. The variable m is incremented at block 912 and it is determined whether additional log pages are to be read to meet the ratio R at block 910. If the ratio R is not yet met, the method 900 loops back to block 906. If the ratio R has been met, $T_x$ is incremented, including x possibly jumping back to zero if the last page of the table has been reached (or jumping to the last page if the first page has been reached, for example). At decision block 916, it is determined whether $T_x = T_y$. If so, the process terminates at block 922. If not, it is determined whether a command has been received from a host system requiring an update to the table.

If an update is required, full reconstruction is put on hold while the method carries out partial reconstruction of one or more pages, as described above with reference to FIGS. 6 and 7. The process then loops back to block 904 after partial reconstruction, or in the case that no command has been received.

Segmented Mapping Table

Figure 10:
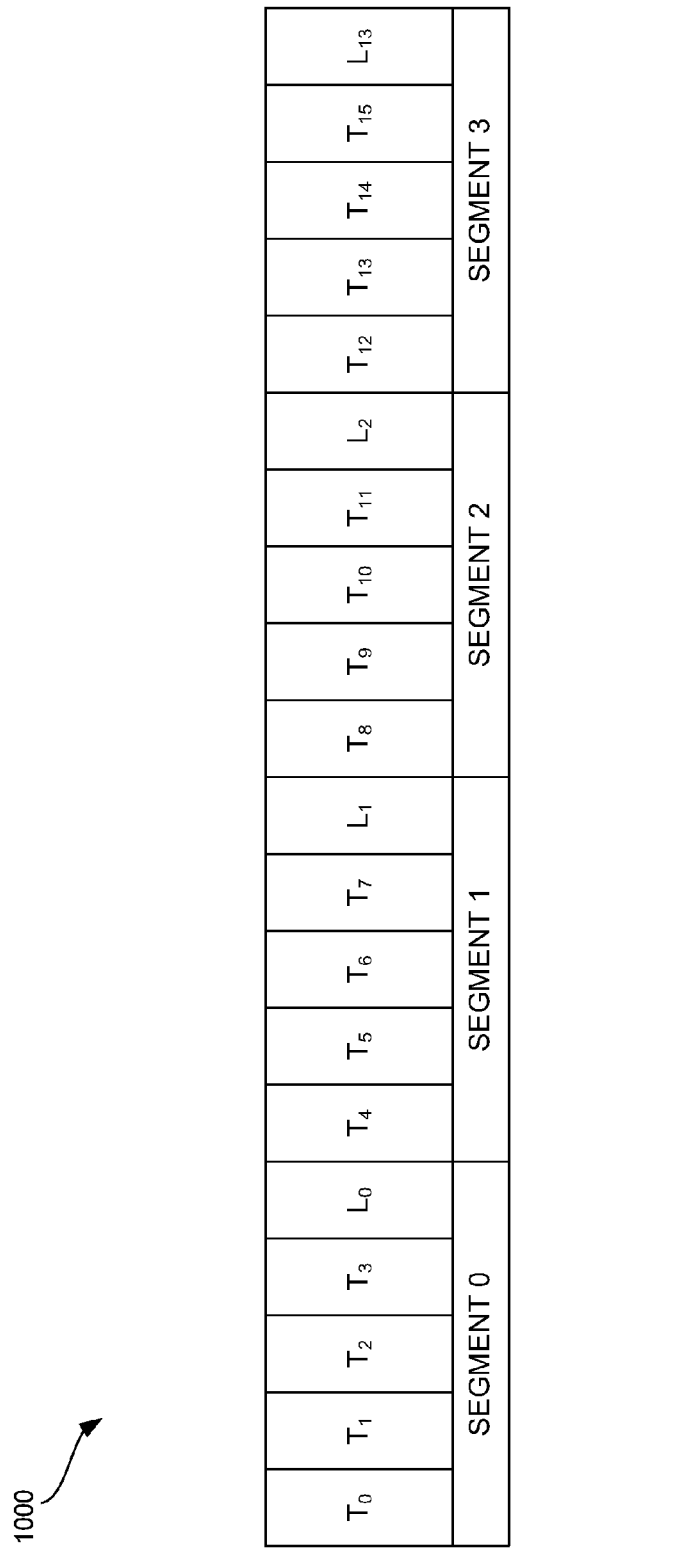
FIG. 10 illustrates an embodiment of portion 1000 of a non-volatile memory array.

FIG. 10 illustrates a portion 1000 of a non-volatile memory array according to one embodiment. For example, memory array portion 1000 may be stored on the non-volatile storage module device 150 of the system 100 shown in FIG. 1. The figure depicts groups of table and log pages as segments (i.e., Segment 0-Segment 3). Each segment includes a portion of the system table data stored in NVM. In this example, mapping table Segment 0 includes four table pages, $T_0$-$T_3$, and a log page, $L_0$. The table pages and log page conform to a predefined ratio R of table pages to log pages when stored in NVM, in this case four to one. In certain embodiments, segments of data are defined by groups, the size of which is determined by the ratio R. As described above, R may be any suitable number, and therefore, segments may be groups of pages of any suitable size.

CONCLUSION

Data storage systems may include system tables of various sizes and/or characteristics. With respect to system tables of a certain size, it may be desirable to store table data and related log data in separate structures. Such systems may take advantage of characteristics of certain non-volatile storage systems that allow for parallel storage of multiple table and/or log pages. However, storage of certain data in separate structures may make coherency of data a concern for purposes of reconstruction of table data. Furthermore, loading partial segments of system table data may require to some extent, or be facilitated by, data coherency.

Certain data storage systems implement serial copying, or "flushing" of system table and/or log data to non-volatile storage. Data coherency may be relatively more easy to attain in such systems, though other considerations, such as load time, may make serial system table and log storage undesirable. In addition, the ability to load partial segments of table data efficiently may still be a concern.

In some embodiments of the present invention, system data and/or associated logs are stored serially in an interleaving manner. In certain embodiments, such a system may allow for satisfactory loading of partial segments of table data while maintaining satisfactory levels of data coherency.

OTHER VARIATIONS

While various embodiments described herein are applicable to non-volatile storage module such as, but not limited to, NAND flash, the systems and methods of this disclosure may also be useful in more conventional hard drives (e.g., shingled hard drives) and hybrid hard drives including both solid-state and hard drive components. The solid-state storage devices (e.g., dies) may be physically divided into planes, blocks, pages, and sectors, as is known in the art. Other forms of storage (e.g., battery backed-up volatile DRAM or SRAM devices, magnetic disk drives, etc.) may additionally or alternatively be used.

Those skilled in the art will appreciate that in some embodiments, other types of table data storage and reconstruction can be implemented. In addition, the actual steps taken in the processes shown in certain figures may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of protection is intended to be defined only by reference to the appended claims.

What is claimed is:

1. A non-volatile storage system comprising:
a non-volatile memory array configured to store data;
a volatile memory; and
a controller configured to:
copy an initial mapping table page of a first set of pages of a logical-to-physical mapping table stored in the volatile memory to the non-volatile memory array;
copy an initial log page of a first set of log pages stored in the volatile memory to the non-volatile memory array in contiguous order with respect to the first set of mapping table pages, wherein the log pages indicate changes to one or more pages of the mapping table;
determine, after the initial mapping table and log pages are copied, whether a predetermined ratio between the first set of mapping table pages and the first set of log pages has been met;
if the predetermined ratio has not been met, continue to copy one or more subsequent mapping table pages and/or one or more subsequent log pages until the predetermined ratio is met;
continue to copy one or more subsequent sets of mapping table pages and one or more subsequent sets of log pages in a contiguous and interleaving configuration according to the predetermined ratio; and
reconstruct the mapping table using a bounded number of read operations based on the copied mapping table pages and log pages.

2. A method of storing mapping table information in a non-volatile storage medium, the method comprising:
storing an initial mapping table page of a first set of pages of a logical-to-physical mapping table in the non-volatile storage medium;
storing an initial log page of a first set of log pages in contiguous order with respect to the first set of mapping table pages, wherein the log pages indicate changes to one or more pages of the mapping table;
determining, after the initial mapping table and log pages are stored, whether a predetermined ratio between the first set of mapping table pages and the first set of log pages has been met;

if the predetermined ratio has not been met, continuing to store one or more subsequent mapping table pages and/or one or more subsequent log pages until the predetermined ratio is met; and continuing to store one or more subsequent sets of mapping table pages and one or more subsequent sets of log pages in a contiguous and interleaving configuration according to the predetermined ratio, wherein the stored mapping table pages and log pages are used to reconstruct the mapping table using a bounded number of read operations.

3. The method of claim 2, wherein the first set of mapping table pages has a first predetermined number of pages, and wherein the first predetermined number is a number between one and four.

4. The method of claim 2, wherein the first set of mapping table pages has a first predetermined number of pages, and wherein the first predetermined number is one.

5. The method of claim 2, wherein the first set of mapping table pages has a first predetermined number of pages, and wherein the first set of log pages has a second predetermined number of pages, and wherein the second predetermined number is thirty-two.

6. The method of claim 2, wherein the one or more subsequent sets of mapping table pages comprise a second set of mapping table pages stored in contiguous order with respect to the first set of log pages and wherein the one or more subsequent sets of log pages comprise a second set of log pages stored in contiguous order with respect to the second set of mapping table pages, wherein each of the first and second sets of mapping table pages has a first predetermined number of pages, wherein each of the first and second sets of log pages has a second predetermined number of pages.

7. A method of recovering a logical-to-physical mapping table including a predetermined number of pages of table data in a non-volatile storage system, the method comprising:

loading into a volatile memory a most recently updated version of an initial table data page of a first set of pages of table data;

loading an initial log page of a first set of log pages into the volatile memory from a contiguously ordered physical position in the non-volatile storage system with respect to the first set of table data pages;

determining, after the initial table data and log pages are loaded, whether a predetermined ratio between the first set of table data pages and the first set of log pages has been met;

if the predetermined ratio has not been met, continuing to load one or more subsequent table data pages and/or one or more subsequent log pages until the predetermined ratio is met; and continuing to load one or more subsequent sets of table data pages and one or more subsequent sets of log pages in a contiguous and interleaving configuration according to the predetermined ratio, wherein the loaded table data pages and log pages are used to reconstruct the mapping table using a bounded number of read operations.

8. The method of claim 7, wherein the first set of table data pages has a first predetermined number of pages, wherein the first set of log pages has a second predetermined number of pages, and wherein the ratio of the first predetermined number to the second predetermined number represents the predetermined ratio.

9. The method of claim 7, wherein the first set of table data pages has a first predetermined number of pages, and wherein the first predetermined number is one.

10. The method of claim 7, wherein the first set of table data pages has a first predetermined number of pages, and wherein the first predetermined number is a number between one and four.

11. The method of claim 7, wherein the one or more subsequent sets of table data pages comprise a second set of table data pages that is distinct from the first set of table data pages loaded into the volatile memory, wherein the first set of table data pages and the second set of table data pages are the same size.

12. A non-volatile storage device comprising:

a logical-to-physical address mapping table including a plurality of pages of mapping data, wherein the plurality of mapping data pages comprise an initial mapping data page;

a plurality of log pages, the log pages indicating changes in one or more of the plurality of pages of mapping data, wherein the plurality of log pages comprise an initial log page; and a controller configured to copy the initial mapping data page and the initial log page in a volatile memory, wherein the controller is further configured to determine, after the initial mapping data and log pages are copied, whether a predetermined ratio between the plurality of mapping data pages and the plurality of log pages has been met, wherein, if the predetermined ratio has not been met, the controller is further configured to continue to copy one or more subsequent mapping data pages and/or one or more subsequent log pages until the predetermined ratio is met, wherein the controller is further configured to continue to copy one or more subsequent sets of mapping data pages and one or more subsequent sets of log pages in a contiguous and interleaving configuration according to the predetermined ratio, and wherein the controller is further configured to reconstruct the mapping table using a bounded number of read operations based on the copied mapping data pages and log pages.

13. The non-volatile storage device of claim 12, wherein the predetermined ratio is between sixteen and thirty-two.

14. The non-volatile storage device of claim 12, wherein the predetermined ratio is between four and sixteen.

15. A method of recovering at least part of a logical-to-physical mapping table including a predetermined number of pages of table data in a non-volatile storage device, the method comprising:

receiving a command from a host system to reconstruct one or more desired pages of the mapping table;

in response to receiving the command:

loading an initial mapping table page of the one or more desired mapping table pages from the non-volatile storage device;

loading an initial log page of one or more log pages from the non-volatile storage device that were recorded in the non-volatile storage device subsequently to at least one of the one or more desired mapping table pages, the log pages indicating changes to be made to the mapping table;

determining, after the initial mapping table and log pages are loaded, whether a predetermined ratio between the mapping table pages and the log pages has been met;

if the predetermined ratio has not been met, continuing to load one or more subsequent mapping table pages and/or one or more subsequent log pages until the predetermined ratio is met; and continuing to load one or more subsequent sets of mapping table pages and one or more subsequent sets of log pages in a contiguous and interleaving configuration according to the predetermined ratio, wherein the loaded mapping table pages and log pages are used to reconstruct the mapping table using a bounded number of read operations, updating the one or more desired mapping table pages in view of the one or more log pages.

* * * * *